United States Patent
Green et al.

(10) Patent No.: US 7,904,914 B2
(45) Date of Patent: Mar. 8, 2011

(54) ON-THE-FLY REPLACEMENT OF PHYSICAL HARDWARE WITH EMULATION

(75) Inventors: Dustin L. Green, Redmond, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 312 days.

(21) Appl. No.: 12/242,377

(22) Filed: Sep. 30, 2008

(65) Prior Publication Data

US 2010/0083276 A1 Apr. 1, 2010

(51) Int. Cl.
*G06F 13/00* (2006.01)
(52) U.S. Cl. .................. 719/321; 718/1; 703/23; 703/24
(58) Field of Classification Search .................. 719/321; 718/1; 703/23, 24
See application file for complete search history.

(56) References Cited

U.S. PATENT DOCUMENTS

| | | | |
|---|---|---|---|
| 4,456,954 A | 6/1984 | Bullions et al. | |
| 6,694,346 B1 | 2/2004 | Aman et al. | |
| 6,732,220 B2 | 5/2004 | Babaian et al. | |
| 7,124,237 B2 * | 10/2006 | Overton et al. | 711/6 |
| 7,743,389 B2 * | 6/2010 | Mahalingam et al. | 719/321 |
| 2005/0091354 A1 | 4/2005 | Lowell et al. | |
| 2005/0235123 A1 | 10/2005 | Zimmer et al. | |
| 2007/0074067 A1 | 3/2007 | Rothman et al. | |
| 2008/0077917 A1 | 3/2008 | Chen et al. | |
| 2008/0127182 A1 | 5/2008 | Newport et al. | |
| 2008/0155223 A1 | 6/2008 | Hiltgen et al. | |
| 2008/0222375 A1 | 9/2008 | Kotsovinos et al. | |
| 2009/0249366 A1 * | 10/2009 | Sen et al. | 719/327 |

FOREIGN PATENT DOCUMENTS

WO   WO 92/12480   7/1992

OTHER PUBLICATIONS

"New Concepts for Data Services Offered by "Virtual Implementation",".
"Novell SUSE Solutions—Linux Enterprise Server 10,", 2007.
"Virtual Servers—Sizing Guide Performance Basics,", Mar. 2005.
International Application No. PCT/US09/057048: International Search Report, dated Apr. 28, 2010, 10 pages.

* cited by examiner

*Primary Examiner* — Andy Ho
(74) *Attorney, Agent, or Firm* — Woodcock Washburn LLP

(57) ABSTRACT

Various aspects are disclosed herein for replacing the hardware backing the memory locations associated with a virtual machine with a backing mechanism. The backing mechanism may have the memory locations appear to contain data convenient to the driver in the virtual machine, typically containing what the hardware would have returned if the hardware had been read from. The data image being returned from the memory locations may travel with the virtual machine even if the virtual machine moves to a different physical machine that does not contain hardware equivalent to the hardware that was recently removed from the virtual machine.

20 Claims, 13 Drawing Sheets

ON-THE-FLY REPLACEMENT OF PHYSICAL HARDWARE WITH EMULATION

FIELD OF TECHNOLOGY

The presently disclosed subject matter relates to the field of computing, and more particularly, to computer virtualization, although virtualization is merely an exemplary and non-limiting field.

BACKGROUND

A virtual machine monitor, such as a hypervisor, is a program that creates virtual machines, each with virtualized hardware resources which may be backed by underlying physical hardware resources. When directly assigning hardware control interfaces to a virtual machine, the virtual machine is typically given direct control of the hardware via what looks like memory accesses (to registers, on-card RAM, etc.). However, when a virtual machine does not respond in a timely manner to requests to give up the hardware control interface, it may be necessary to eventually remove the hardware control interface from the virtual machine. A problem with this approach is that the device driver in the virtual machine may be in the middle of using the hardware control interface when the interface is removed, and thus the associated driver in the virtual machine may receive unexpected values as it tries to read from memory locations that were previously backed by the hardware. For example, an unexpected loss of the memory access may leave memory locations that now read as 0xFF for every byte. The unexpected values can potentially cause the child driver to crash, loop, or deadlock.

Another problem is that virtual processors can be paused on the boundary between any two instructions, and it is difficult to write and test a driver that handles hardware removal at any such arbitrary instruction boundary. Real physical processors usually operate in a mode in which instructions are executed quickly and without interruption. Thus, other techniques are needed in the art to solve the above described problems.

SUMMARY

Various methods and systems are disclosed herein for replacing the hardware backing the memory locations associated with a virtual machine with a backing mechanism. The backing mechanism may have the memory locations appear to contain data convenient to the driver in the virtual machine, typically containing what the hardware would have returned if the memory had been read from. By providing such a backing mechanism, the driver may check for hardware removal much less frequently, making the driver easier to write and test. The data image being returned from the memory locations may now travel with the virtual machine even if the virtual machine moves to a different physical machine that does not contain any hardware equivalent to the hardware that was recently removed from the virtual machine.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 5 is an exemplary diagram illustrating an address space that random access memory (RAM) may reside in;

DETAILED DESCRIPTION

Virtual Machines in General Terms

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1A:
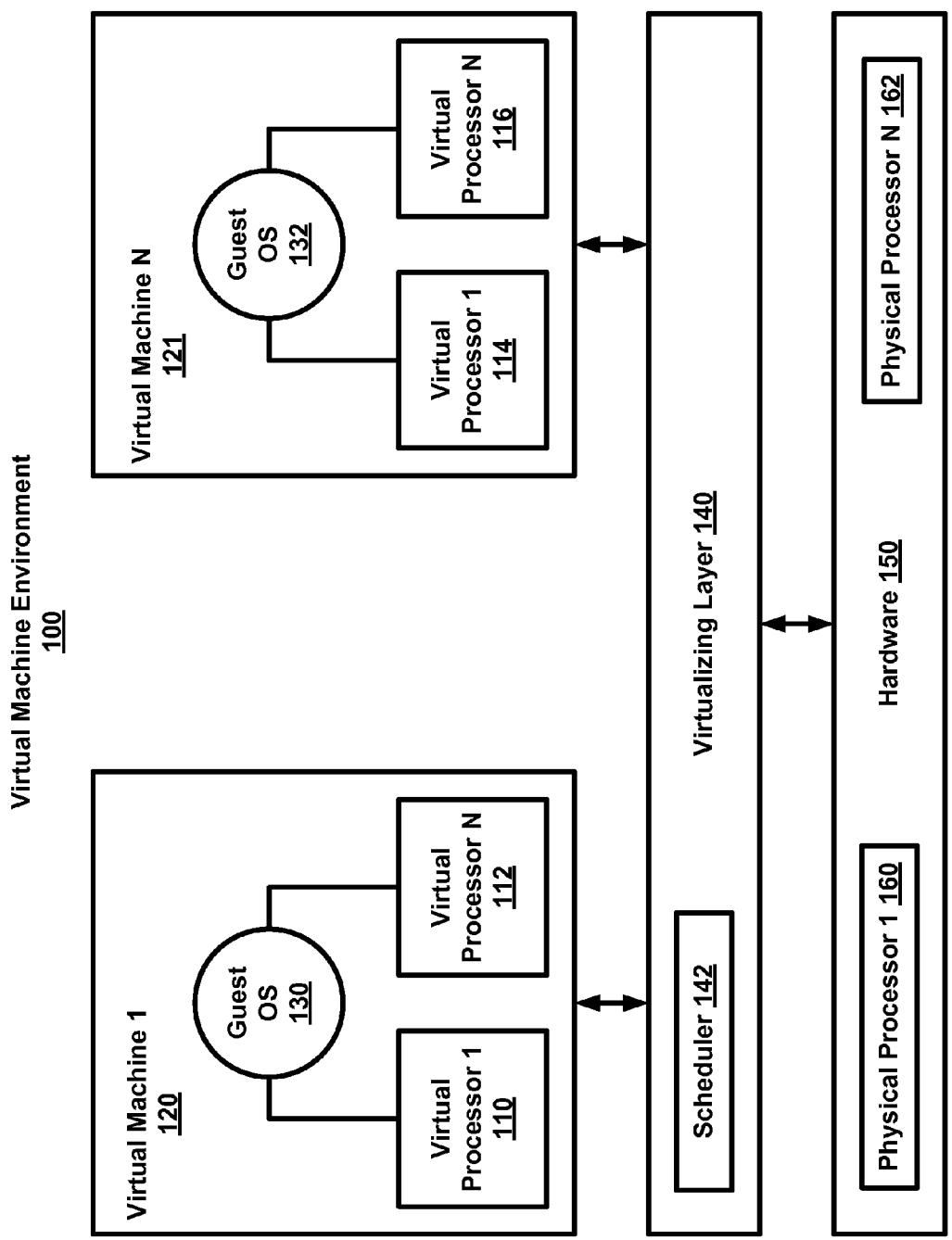
FIG. 1a illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

Figure 1B:
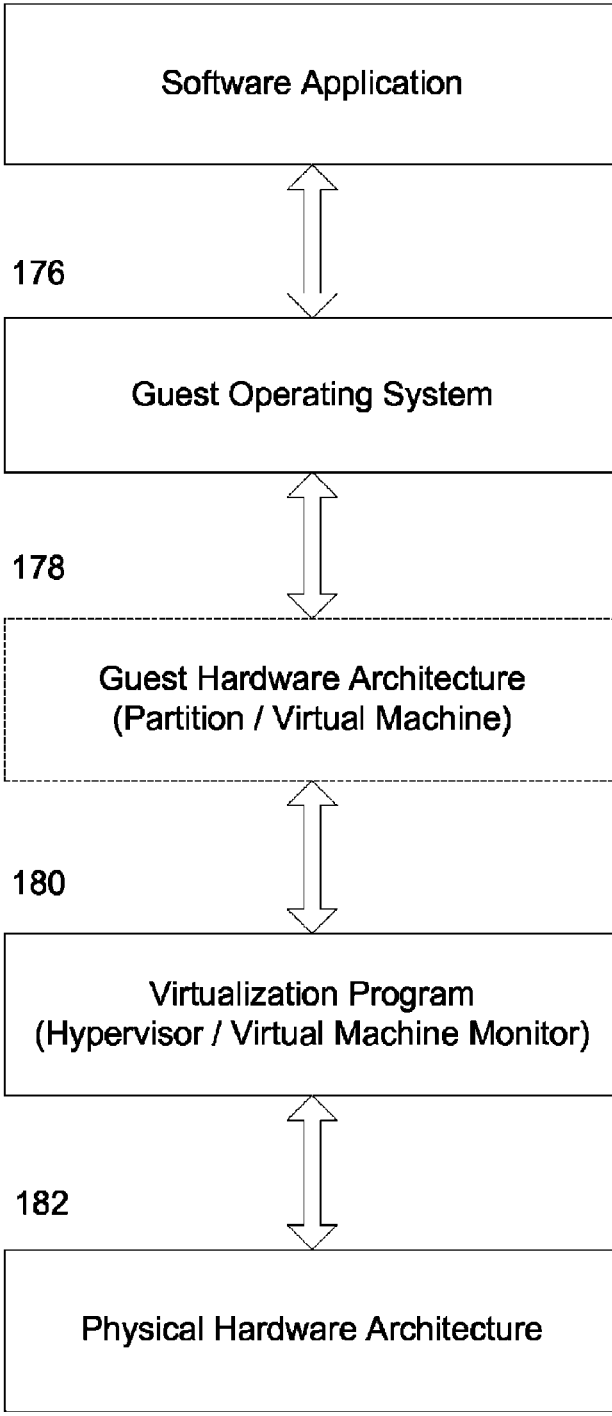
FIG. 1b illustrates a diagram representing the logical layering of the hardware and software architecture for a virtualized environment in a computer system.

FIG. 1b is a diagram representing the logical layering of the hardware and software architecture for a virtualized environment in a computer system. In FIG. 1b, a virtualization program 180 runs directly or indirectly on the physical hardware architecture 182. The virtualization program 180 may be (a) a virtual machine monitor that runs alongside a host operating system, (b) a host operating system with a hypervisor component, where the hypervisor component performs the virtualization, (c) hardware, or (d) micro-code. The virtualization program may also be a hypervisor which runs separately from any operating system. In other words, the hypervisor virtualization program need not run as part of any operating system, and need not run alongside any operating system. The hypervisor virtualization program may instead run "under" all the operating systems, including the "root partition." The virtualization program 180 virtualizes a guest hardware architecture 178 (shown as dashed lines to illustrate the fact that this component is a "partition" or a "virtual machine"), that is, hardware that does not actually exist but is instead virtualized by the virtualizing program 180. A guest operating system 176 executes on the guest hardware architecture 178, and a software application 174 can run on the guest operating system 176. In the virtualized operating environment of FIG. 1b, the software application 174 can run in a computer system even if the software application 174 is designed to run on an operating system that is generally incompatible with a host operating system and the hardware architecture 182.

A virtual machine typically contains an entire operating system and a set of applications, which together constitute many processes, the entirety of which may be referred to as "workload" or "process" in the context of virtual machines. In the present disclosure the terms "process" and "workload" may be used interchangeably in the context of virtual machines, and those skilled in the art will readily understand that "process" may refer to multiple processes including all of systems and applications that may be instantiated in a virtual machine.

Figure 2:
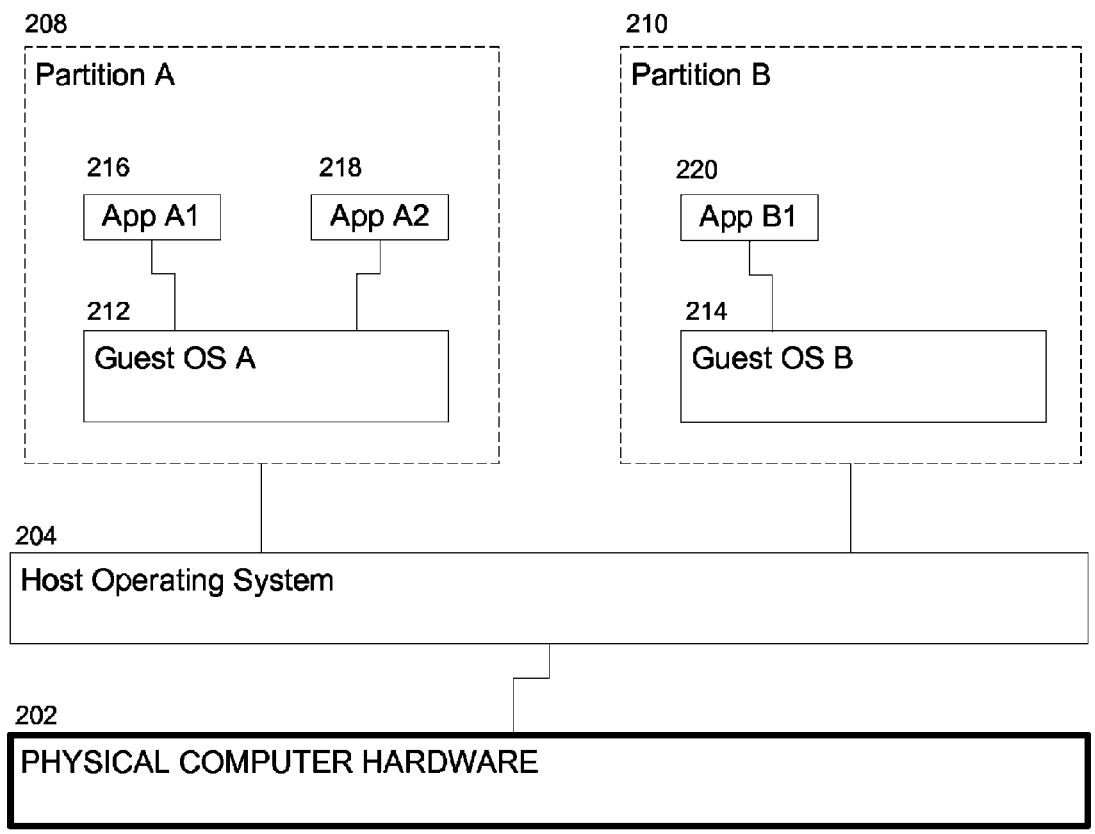
FIG. 2 illustrates an exemplary virtualized computing system.

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that may exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
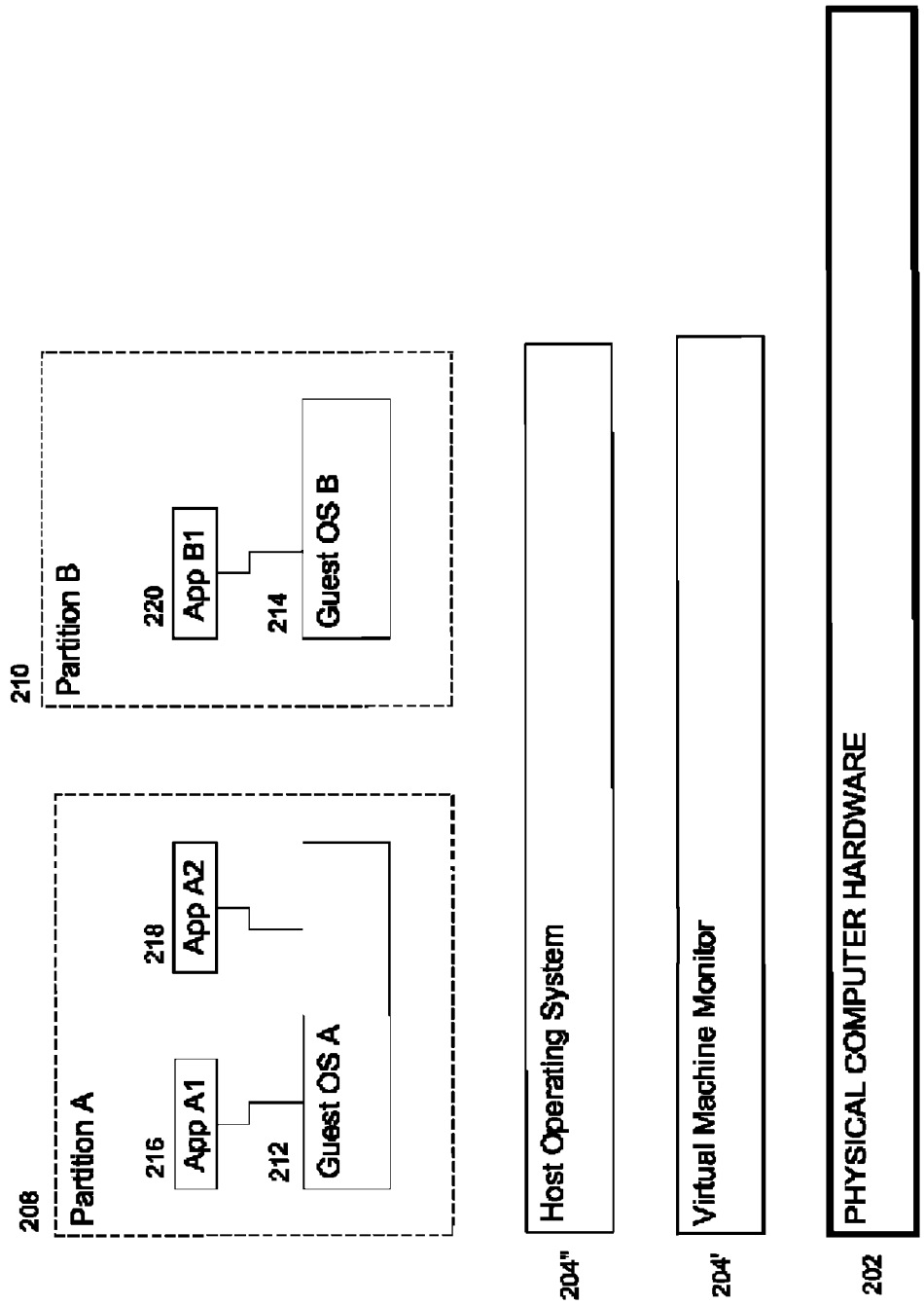
FIG. 3 illustrates an alternative virtualized computing system.

FIG. 3 illustrates an alternative virtualized computing system where the virtualization is performed by a virtual machine monitor (VMM) 204' running with the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204"

(although still interacting with the host operating system 204" in order to coordinate use of the computer hardware 202 and avoid conflicts and the like).

Figure 4:
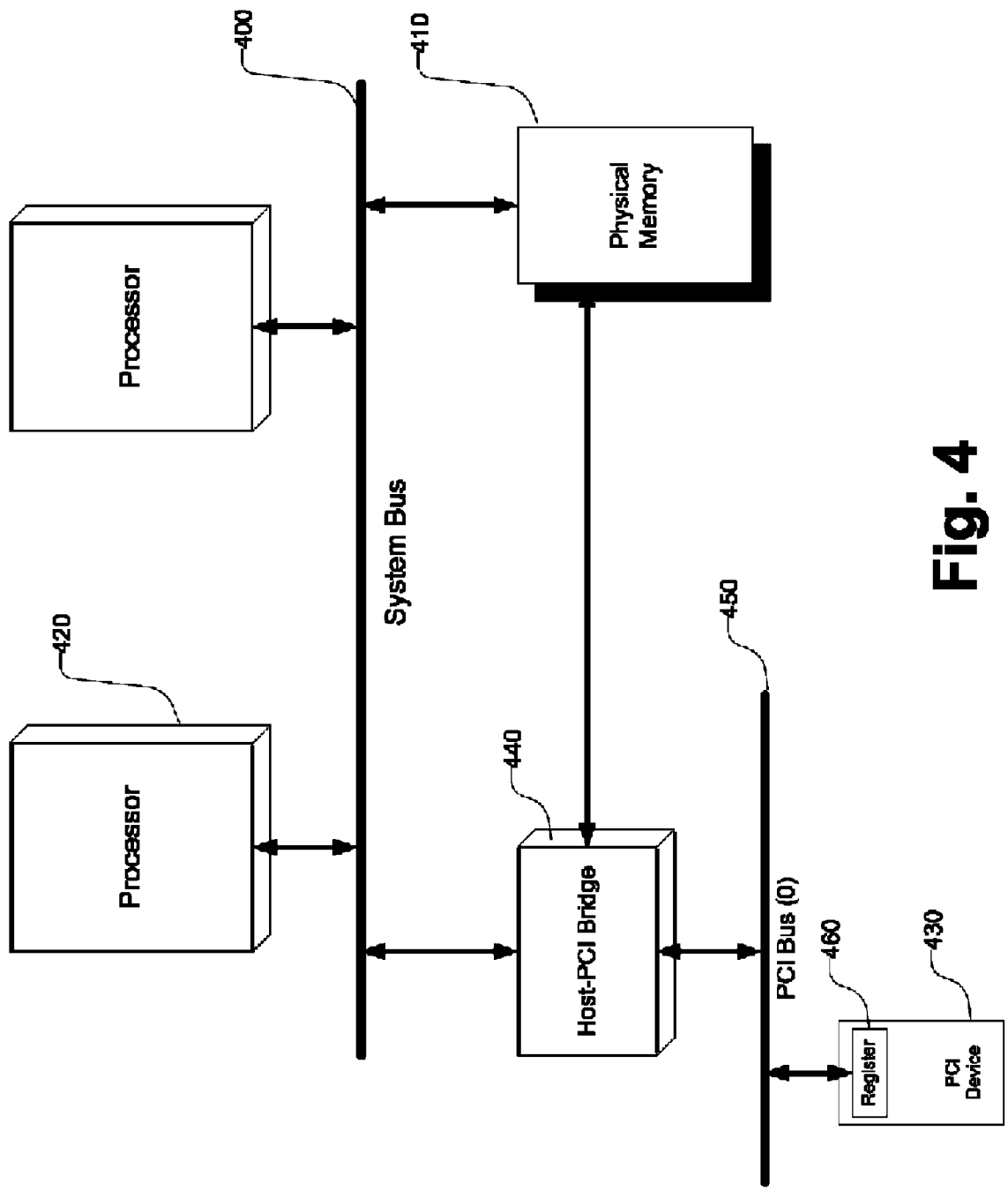
FIG. 4 depicts an exemplary system diagram illustrating input/output (I/O) space and memory mapped I/O (MMIO) as it relates to Peripheral Component Interconnect (PCI) devices.

FIG. 4 depicts an exemplary system diagram illustrating IO space and MMIO as it relates to PCI devices. The PCI specification defines three address spaces—Memory, I/O and Configuration. The term MMIO is used herein to refer to "memory" as defined in the PCI specification in order to distinguish the PCI term "memory" from RAM. The diagram include a system bus 400, physical memory 410, processor 420, a PCI device 430 with register 460, and a host-PCI bridge device 440. Attached to the host-PCI bridge device 440 is a PCI bus 450, and attached to the PCI bus is the PCI device 430. The PCI device 430 contains one ore more registers 460 at a memory location that must be read and written from the system processors in order to control the device. It can be seen that the physical memory address spaces may be distinct from the IO port space which may be a separate address space. IO resources may be translated into MMIO resources, which is one reason why IO port address space may be mapped via memory mapped IO port accesses.

Figure 5:
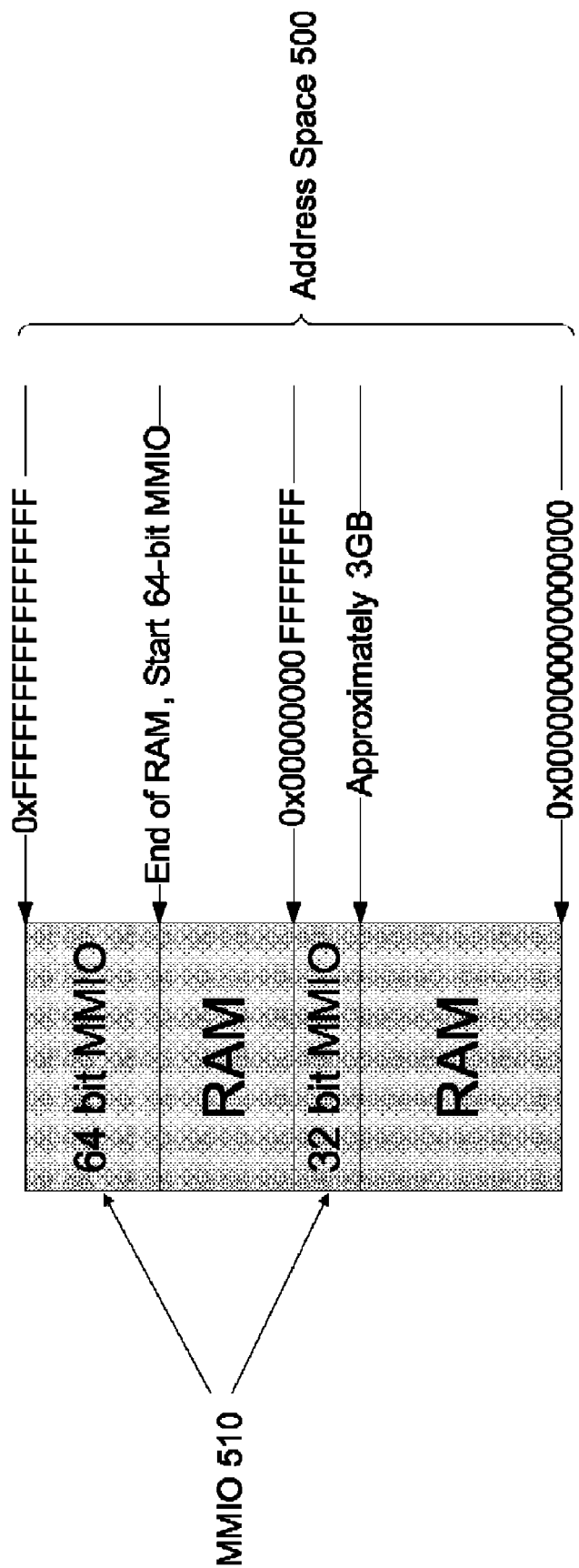

Referring to FIG. 5, shown is a diagram illustrating the address space 500 that RAM may reside in. As shown, memory mapped input/output (MMIO) areas 510 may also reside in the same address space. Typical modern address-space-based hardware control interfaces reside in the MMIO portion of this address space. System physical address space generally refers to the physical address space 500 of the physical computer system, as does "guest physical address space" which also refers to the "physical" address space 500 of a virtual computer system. However, guest physical addresses do not necessarily occupy a region of RAM as guest physical addresses are a virtual construct. A hypervisor may map some or all guest physical ranges into real system physical address space, and in fact it will frequently do so in practice. However, there can also be ranges of guest physical address space that are not mapped anywhere, as when a hypervisor is in the process of taking a snapshot of a running virtual machine.

The physical memory address space 500 is typically separate from the IO port space. The separate IO port space may be used to control older devices, and may be also be used to set up and configure newer devices since PCI configuration space is typically accessed via IO port space. Furthermore, IO port space addresses are typically 16 bits rather than 32 bits or 64 bits.

All of these variations for implementing the above mentioned partitions are just exemplary implementations, and nothing herein should be interpreted as limiting the disclosure to any particular virtualization aspect.

Replacement of Physical Hardware with Emulation

In various embodiments disclosed herein, the hardware backing the memory locations associated with a virtual machine may be replaced with a backing mechanism. The backing mechanism may present the memory locations as appearing to contain data used by the driver in the virtual machine. Such data may typically represent what the hardware would have returned if the hardware had actually been read. By providing such a backing mechanism, the driver may check for hardware removal much less frequently, making the driver easier to write and test. The data image being returned from the memory locations may now travel with the virtual machine even if the virtual machine moves to a different physical machine that does not contain hardware equivalent to the hardware that was recently removed from the virtual machine.

In an embodiment, the hardware control interface portion of the address space may be replaced with data and behaviors convenient to or requested by a driver in the virtual machine when the hardware is removed from the virtual machine. In various embodiments, the data and behaviors convenient for a driver in the virtual machine may be moved with the virtual machine when the virtual machine is saved, snapshotted, live-migrated, and the like. A virtual machine may be saved, for example, when the machine is being torn down.

Snapshotting, for example, may take place when the virtual machine state needs to be fully characterized. A virtual machine state may comprise data necessary to define a process or transaction at a particular point in time. A snapshot may comprise a copy of a set of states and data as they were at the desired point in time. In a virtual machine session a whole-system snapshot may be executed by dumping the entire machine state to a backing file. Portions of the dumping may occur on a copy-on-write basis while the virtual machine is still running. Live migration is the process of transferring a virtual machine between different locations and environments. In various embodiments the code and data may be moved with the virtual machine. For example, the code and data may comprise a file linked to the virtual machine file. The data and behaviors may become part of the state of the virtual machine until the virtual machine indicates that data and behaviors are no longer needed.

In various embodiments, a special memory region may be created that the virtual machine may consider to be part of the hardware control interface, but which is actually provided by the virtualization system. The special memory region may contain a memory location which the virtual machine can read to determine if the hardware interface is currently available or if the hardware interface has been removed. Such memory reads may be fast and thus a driver in the virtual machine may check for hardware interface removal as needed without impacting system performance.

The portion or scope of the device assigned to the virtual machine may vary. For example, the virtual machine may be given control of the device to the exclusion of other virtual machines. Alternatively, the virtual machine may only be assigned a single hardware control interface among multiple interfaces available on the device.

As further described below, in various aspects of the present disclosure the duration of use of the hardware control interface portion of the address space after the real hardware control interface is removed from the address space may be varied according to different implementations. In one embodiment, a driver in the virtual machine may be configured to stop using the hardware control interface as soon as possible after the real hardware control interface is removed from the address space. In another embodiment, the driver in the virtual machine may continue using the hardware control interface indefinitely after the real hardware control interface is removed from the address space. This embodiment may further incorporate the emulation behaviors described below.

In various embodiments, specific behaviors of the portion of the address space previously occupied by the hardware-control interface may be implemented as further described below. Such a middle-ground approach between a static data representation and full emulation may be desirable due to the ease with which the state and data may be carried from one virtual machine to another. Furthermore, such an approach may be advantageous because it does not involve externally carrying third-party code (e.g., drivers) from one hypervisor to another.

In one embodiment, bit-level emulation of basic behaviors may be implemented. Some example embodiments may include:

i. Read-only.
ii. Always-0 on read.
iii. Always-1 on read.
iv. Read-write.
v. Write of 1 clears, write of 0 leaves alone.
vi. Write of 1 sets, write of 0 leaves alone.
vii. Write of 0 clears, write of 1 leaves alone.
viii. Write of 0 sets, write of 1 leaves alone.
ix. Clear to 0 after first read.
x. Set to 1 after first read.

In another embodiment, full emulation of a device may be provided when the hardware interface is removed. Full emulation may comprise scripted or programmatic handling in software of virtual machine accesses to the address space previously occupied by the hardware control interface.

It will be readily appreciated by those skilled in the art that the presently described mechanisms may be generally described in terms of arbitrary software-implemented emulation behavior proxying for a removed hardware-control interface from a virtual machine. Of course, these are merely exemplary (and hence non-limiting) aspects that could be additionally supplemented or substituted by any of the other aspects discussed herein.

The address space in which a hardware control interface resides is typically the same address space in which the random access memory (RAM) resides. Hardware control interfaces may also reside in the input/output (IO) port space and in the PCI configuration space. If the hardware control interface is in the RAM address space, then the interface may be accessed by a driver in the virtual machine using normal memory access instructions. If the hardware control interface is in the IO port address space, then the interface may be accessed by a driver in the virtual machine using IO port access instructions or memory-mapped IO port accesses. If the hardware control interface is in the PCI configuration space, then the interface may be accessed by a driver or indirectly by the OS in the virtual machine via IO port access instructions or memory-mapped IO port accesses. The various embodiments disclosed herein assume that the hardware control interface is in the same address space as RAM and that the hardware control interface is accessed using memory reads and writes. In embodiments where the hardware control interface is in IO port address space, then IN and OUT operations may be used instead of read and write. Those skilled in the art will readily recognize that the present disclosure is applicable to an address space regardless of the type or the specific instructions used to access the address space.

Direct assignment of address-space-based hardware control interfaces to a virtual machine is typically desirable for performance reasons. When an address-space-based hardware device control interface is directly assigned to a virtual machine, a portion of an address space of the virtual machine may be mapped to a portion of a system physical address space occupied by the hardware device control interface. This mapping may be achieved via software, hardware, or a combination of the two. Once the mapping is established, the virtual machine may control the hardware via the hardware device control interface.

Hot removal is the unexpected removal of a system component while the system or subsystem is operating. Hot removal of address-space-based hardware control interfaces from a physical machine is a capability that may exist in many systems. However, hot removal is typically not acceptable for the removal of hardware control interfaces from a virtual machine because in virtual machines, the driver using the hardware control interface cannot be trusted or fully tested to stop using the hardware control interface when requested without taking an arbitrary amount of time to do so. It is typically not acceptable to wait for a virtual machine to finish using the hardware control interface before removing the hardware control interface from the virtual machine. Waiting for the virtual machine as described may give the virtual machine control over how long the removal takes, which is typically not desirable. A timeout period may be used to allow the virtual machine to complete the necessary transactions prior to removing the interface. However, if the timeout is reached and the hardware is removed without an agreement from the virtual machine, the virtual machine may respond erroneously or crash when the driver in the virtual machine subsequently attempts to access the hardware. It is generally difficult to calculate a known safe timeout value because of the variability and unpredictability of system and component behavior. Additionally, even a reasonably safe timeout value may give the virtual machine undue control over the duration of the removal operation.

In various embodiments the scope of control over a device that is assigned to the virtual machine may vary. In one embodiment, the virtual machine may be given control of a device to the exclusion of other virtual machines. Alternatively, the virtual machine may be only assigned a single hardware control interface among more than one available interface on a device. In either case, the virtualization system may retain control of at least some system-level control aspects of the device by virtualizing those parts of the relevant address spaces for the virtual machine. For example, the PCI configuration space of a device typically includes fields that may be directly viewed by the virtual machine. The PCI configuration space may also include some fields that can be directly written by a virtual machine with minimal virtualization. However, certain portions of the PCI configuration space, such as the base address register portion, must be completely virtualized even if the virtual machine is assigned the entire device function to the exclusion of other virtual machines. With devices that support PCI IO virtualization in accordance with the PCI Special Interest Group (SIG) Single Root I/O Virtualization and Sharing Specification, the hardware itself may provide a physical function and virtual functions. Virtual functions are designed to be assignable to virtual machines, and different virtual functions can be assigned to different virtual machines and multiple virtual machines can be used by multiple virtual functions at the same time. Thus one of skill in the art can recognize that the present disclosure may be implemented across various granularities and levels of direct hardware control interface assignments to virtual machines.

Disclosed herein are various methods and systems for removing the hardware control interface in a way that may enable a driver in the virtual machine to continue operation when the driver in the virtual machine subsequently accesses the removed portion of the virtual machine address space. By continuing normal or expected operations, the driver in the virtual machine may avoid erroneous behaviors due to unexpected read/write operations resulting from the hardware removal. The typical result when the hardware control interface is removed is that the portion of the virtual machine address space that had been occupied by the hardware control interface becomes unmapped. One exemplary result of safe hardware removal may be that writing operations to the removed address space may be ignored, and read operations to the removed address space may return "1" bits.

In one embodiment, the portion of the virtual machine address space that had been occupied by the hardware control interface may be mapped to behavior that is safe or convenient for the driver in the virtual machine until the driver in the virtual machine has completed transactions that use the hardware control interface. By mapping the hardware control interface to behavior that is safe or convenient for the driver, the actual hardware control interface may be removed from the virtual machine as needed without waiting for the driver in the virtual machine. Furthermore, the hardware control interface may be removed with much less risk that the driver in the virtual machine will crash or enter an unexpected state after an attempt by the driver to access the hardware control interface. In a further embodiment, the replacement behavior for the mapped portion of the virtual machine address space may remain associated with the virtual machine until such time as the driver in the virtual machine has completed attempts to use the hardware control interface.

The above described replacement behavior may generally comprise various forms of emulation. The following are exemplary behaviors that may be implemented in accordance with the present disclosure.

1. Per-bit behaviors a. Read-only. In this behavior, data may be determined at the time of the removal of the hardware control interface and may not be changed by the virtual machine after that point. This may provide a more efficient representation of a grouping of "Always-0"/"Always-1" regions.

b. Always-0 on read. This behavior may be similar to a read-only scenario wherein the value is always 0.

c. Always-1 on read. This behavior may be similar to a read-only scenario wherein the value is always 1.

d. Read-write. In this behavior, the data may initially be determined at the time of removal of the hardware control interface. However, data may be changed by the virtual machine after that point.

e. Write of 1 clears, write of 0 leaves alone. The device hardware typically uses this kind of behavior to enable software to acknowledge that a notification bit was set. The software may acknowledge the set bit by performing a memory write with a 1 in the position of the set bit. This behavior typically results in the bit being cleared when the register is read back again.

f. Write of 1 sets, write of 0 leaves alone. In this case the hardware and software may use this kind of bit for software to notify hardware (reverse of scenario (e) above).

g. Write of 0 clears, write of 1 leaves alone. This is a variation of the previous scenario.

h. Write of 0 sets, write of 1 leaves alone. This is a variation of the previous two scenarios.

i. Clear to 0 after first read. In some cases the hardware may assume that the software received a notification by the mere act of the software performing a read.

j. Set to 1 after first read. This is a variation of the previous scenario.

2. Emulation—Other embodiments may implement a scripted or programmatic handling in software of the virtual machine accesses to the address space previously occupied by the hardware control interface. In various embodiments, limited emulation or full emulation may be implemented. In limited emulation, the level of emulation may be sufficient to maintain uninterrupted transactions with the driver software until the driver software can complete any pending operations and determine that the hardware control interface is no longer present. The level of emulation may not be sufficient to actually continue performing the function of the device indefinitely. In full emulation, the level of emulation may enable the driver within the virtual machine to continue performing its normal functions.

The replacement behavior and the behavior's current state may continue to be associated with the virtual machine as part of the virtual machine's state until such time as the driver in the virtual machine reports that it has completed transactions that require accessing the hardware control interface. The replacement behavior may continue to be associated with the virtual machine even if the virtual machine moves to a different host physical machine, or if the virtual machine is saved to disk and restored at a later time.

The hardware control interface may be augmented with a special region of memory that includes a data element which indicates to the driver running in the virtual machine whether or not the hardware control interface is fully available and providing full functionality. Such a special region of memory may comprise a single page of memory. The driver running in the virtual machine may also receive one or more messages indicating that the hardware control interface has been removed. However, if the driver in the virtual machine needs to check whether the hardware was present up to a particular point in the execution of the driver code, the driver code may check this data element to determine if the hardware interface was backed by real functionality up to the point in the driver code that read the data element. Reading the data element is typically a fast operation, so the driver in the virtual machine may frequently check without undue performance impact. The driver in the virtual machine may perform a series of register reads, then check to see if the hardware interface is still assigned to the virtual machine. If not, the driver may ignore the read data completely. However, if the hardware was still associated with the virtual machine after the register reads, the driver in the virtual machine may determine that the data read from the registers was actually read from the hardware and is valid.

In the case where the replacement behavior is full emulation, the driver in the virtual machine may continue to use the hardware control interface, and in some cases indefinitely. Alternatively, the driver may discontinue use of the hardware control interface at a convenient time (e.g., when the driver has completed pending transactions that may require access to the interface). If the replacement behavior is a limited hardware control interface emulation, the driver may discontinue use of the hardware control interface after a period of time (e.g., when the use may be discontinued safely even if transactions are still pending). Typically this time period should be as soon as possible after the driver has completed desired transactions. In either case, the driver in the virtual machine may still access the hardware control interface after a virtual machine has already been moved to a different physical machine that doesn't actually have an associated hardware device with the same hardware control interface. If full emulation is provided, then connectivity to the same underlying storage device, network, or other resource may be required in order to continue providing device functionality via the full hardware emulation.

Those skilled in the art will recognize that the present disclosure is applicable to the assignment and re-assignment of entire devices. Furthermore, the present disclosure may generally be applied without limit to any specific hardware control interface among multiple hardware control interfaces provided by a device. The present disclosure may generally be applied regardless of the specific steps required to emulate any specific hardware control interface (or in the case of full emulation, the steps required to emulate the hardware control interface and the functionality of the device).

The following are non-limiting examples illustrating various embodiments of the methods disclosed herein. In one embodiment, the hardware may not hold any state that the virtual machine needs to preserve when the hardware interface is removed. One exemplary configuration is a networking interface that operates in a packet-based manner where packet loss is acceptable. In this case, the virtual machine may or may not have an alternate path to the same network using the same MAC address. In other exemplary configurations the path may be maintained at a higher layer, such as an IP address. In one embodiment the following hardware removal steps may be taken:

1. Pause the virtual processors of the virtual machine.
2. Remove the hardware control interface from the virtual machine by removing the mapping that maps from the portion (memory region) of the virtual machine address space to the hardware control interface.
3. Optionally, read any data needed from the hardware control interface.
   a. In this example, the data read from the hardware may be limited to data needed in order to provide sufficient hardware emulation to avoid crashing the driver in the virtual machine and prevent the driver in the virtual machine from commencing invalid actions (e.g., delivering invalid data to the rest of the virtual machine). This limited data may include the content of current register values and the like. The data typically does not need to include packet data, but such data may be included.
4. Set up emulated behavior.
   a. In the current example, the emulated behavior may include behaviors from the list of per-bit behaviors described above, with a potentially different behavior for each bit.
   b. The emulated behavior may become associated with the virtual machine and may move with the virtual machine until the driver in the virtual machine reports that it has completed pending attempts to access the hardware control interface.
5. Map the portion of the virtual machine address space to the desired emulated behavior.
6. Change the "hardware present" value in the special memory region to indicate that the hardware is no longer present.
7. Un-pause the virtual processors of the virtual machine.
8. Optionally, send a message to the driver in the virtual machine that the hardware has been removed and to discontinue attempts to access the hardware.
9. Eventually, the driver in the virtual machine may report that the driver has completed attempts to access the hardware control interface. At this point, the emulated behavior may be removed from the virtual machine.

In one embodiment, the hardware may hold state information that needs to be preserved in order for the virtual machine to continue executing without disruptions. Such state data may be above and beyond data needed for the convenience of the driver in the virtual machine. One example is when a networking interface is operating in a connection-based manner where the connections are lossless. In such a case, transmitted or received data must not be lost if the connection is to remain established and valid, even when the critical data is currently stored in the hardware device. In this case the virtual machine may be presumed to have an alternate path to the same network using the same MAC address (otherwise, there would be no point in preserving connections). In this case, the driver in the virtual machine may be notified that the hardware will be removed so that the driver can attempt to extract the connection state data from the hardware before the hardware is removed. The driver in the virtual machine may then report when it is finished so that the hardware can be removed. It is desirable for such notification to be provided as soon as possible. In an embodiment the following hardware removal steps may be taken in this case:

1. The virtualization system may send a message to the driver in the virtual machine that the hardware control interface will be removed.
2. The virtualization system may wait for a predetermined time, or a first period of time, for a message from the driver in the virtual machine indicating that the driver has completed extracting data from the hardware. The virtualization system may continue to the next step when the predetermined time expires, or when the virtualization system receives a message from the driver that the driver has completed extracting data from the hardware. The time period may generally be determined by estimating, for example, an average period of time to complete the most common transactions used by a particular driver.
3. Pause the virtual processors of the virtual machine.
4. Remove the hardware control interface from the virtual machine by removing the mapping that maps from the portion (memory region) of the virtual machine address space to the hardware control interface.
5. Read any needed data from the hardware control interface.
   a. In this embodiment, the driver in the virtual machine was previously provided a predetermined amount of time to extract data from the hardware device. However, the driver in the virtual machine may not have completed the data extraction because the virtualization system may have continued the removal steps when the predetermined time period expired rather than waiting indefinitely for the virtual machine to complete its processes. Therefore the driver in the virtual machine may still make attempts to access the portion of the virtual machine address space that contained the hardware control interface when the virtual processors are later un-paused.
   b. In this embodiment, the data read from the hardware may be limited to data needed in order to provide sufficient hardware emulation to avoid crashing the driver in the virtual machine and prevent the driver in the virtual machine from commencing invalid actions (e.g., delivering invalid data to the rest of the virtual machine). This limited data may include the content of current register values and the like. The data typically does not need to include packet data, but such data may be included.
6. Set up emulated behavior.
   a. In this embodiment, the emulated behavior may include behaviors from the list of per-bit behaviors described above, with a potentially different behavior for each bit.
   b. The emulated behavior may become associated with the virtual machine and may move with the virtual machine until the driver in the virtual machine reports that it has completed pending attempts to access the hardware control interface.
7. Map the portion of the virtual machine address space to the desired emulated behavior.
8. Change the "hardware present" value in the special memory region to indicate that the hardware is no longer present.
9. Un-pause the virtual processors of the virtual machine.
10. The driver in the virtual machine may eventually report, after expiration of the predetermined timer, that it has completed extracting state data from the hardware control interface. If this occurs, the message may be ignored or discarded.
11. Eventually, the driver in the virtual machine may report that the driver has completed attempts to access the hardware control interface. At this point, the emulated behavior may be removed from the virtual machine.

In another embodiment, if the software executing outside of the virtual machine is appropriately configured, the outside software may perform the steps necessary to extract the data needed from the hardware on behalf of the driver in the virtual machine, without the involvement of the driver. Data extraction by the software outside of the virtual machine may be possible even if the amount and complexity of the state data is significant and requires significant synchronization with the hardware as in the examples above.

In a further embodiment, a hardware control interface may be replaced with full software emulation of the hardware control interface. In one embodiment, a complete software emulator of a hardware control interface may be provided. In this case the driver in the virtual machine may continue to use the hardware control interface as if the interface represented the actual hardware. The software emulating the hardware control interface may provide the full range of functionality in emulating the hardware control interface. Those skilled in the art will understand that in this embodiment the hardware interfaces may be replaced with a complete emulation but that the specific complexity or scope of the emulation may vary depending on the particular system configuration. Such emulation may comprise extraction of state data from the hardware by code executing outside of the virtual machine. In this case, the extracted state data should be sufficient to represent the state in order to fully emulate the hardware from the point at which the hardware interface was removed or interrupted and not simply any state that is useful to the virtual machine. Furthermore, transactions or operations that are currently in-progress in the hardware may be allowed to complete before the state is extracted from the hardware.

The presently disclosed aspects can be implemented as systems, methods, computer executable instructions residing in computer readable media, and so on. Thus, any disclosure of any particular system, method, or computer readable medium is not confined there to, but rather extends to other ways of implementing the disclosed subject matter.

Figure 6:
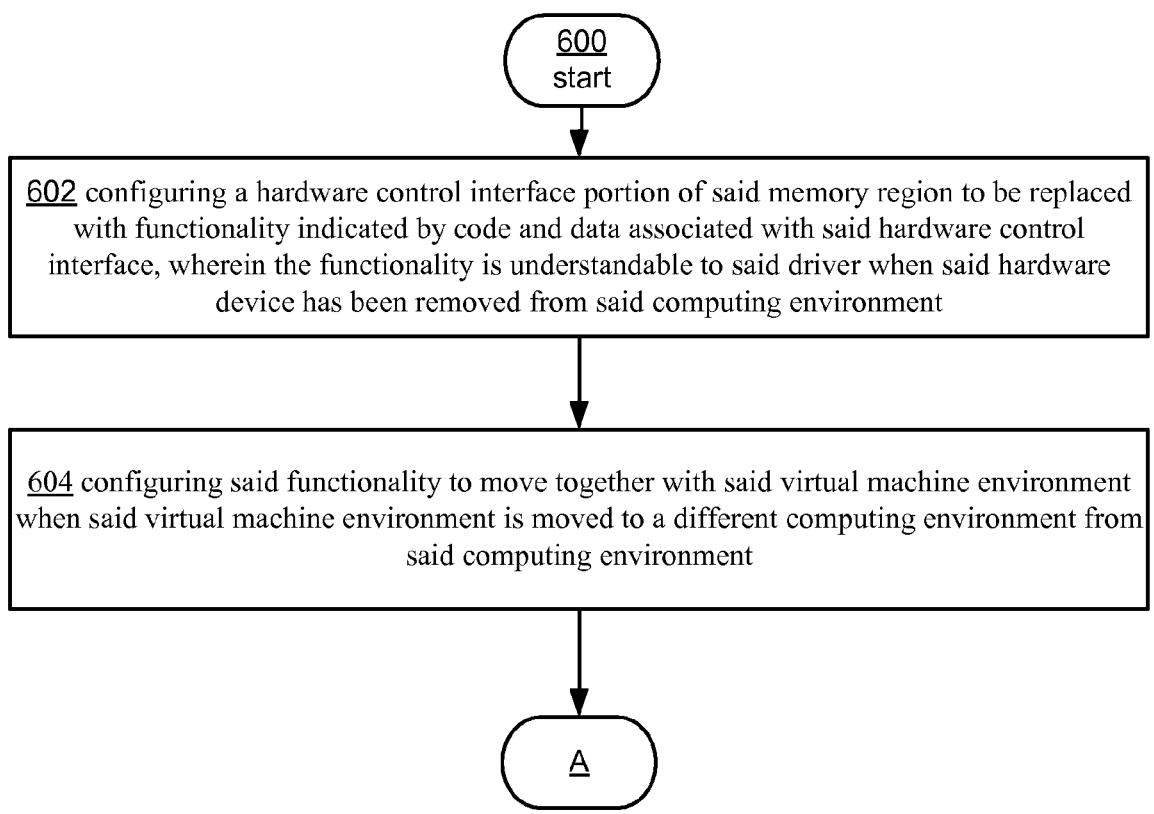
FIG. 6 illustrates an example of an operational procedure for maintaining accessibility to a memory region corresponding to a hardware device for a driver residing in a virtual machine environment.
Figure 7:
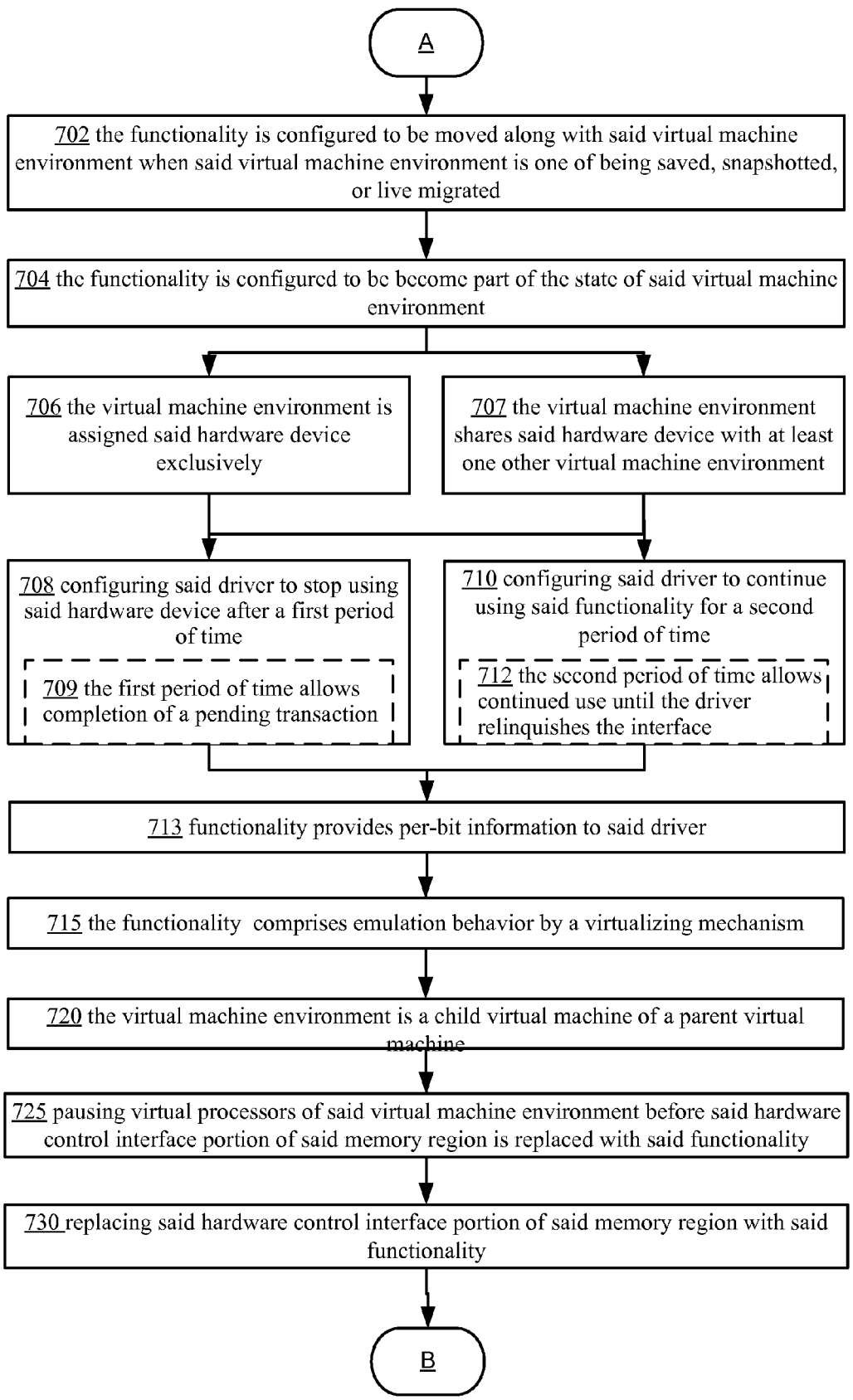
FIG. 7 illustrates an example of an operational procedure for maintaining accessibility to a memory region corresponding to a hardware device for a driver residing in a virtual machine environment.
Figure 8:
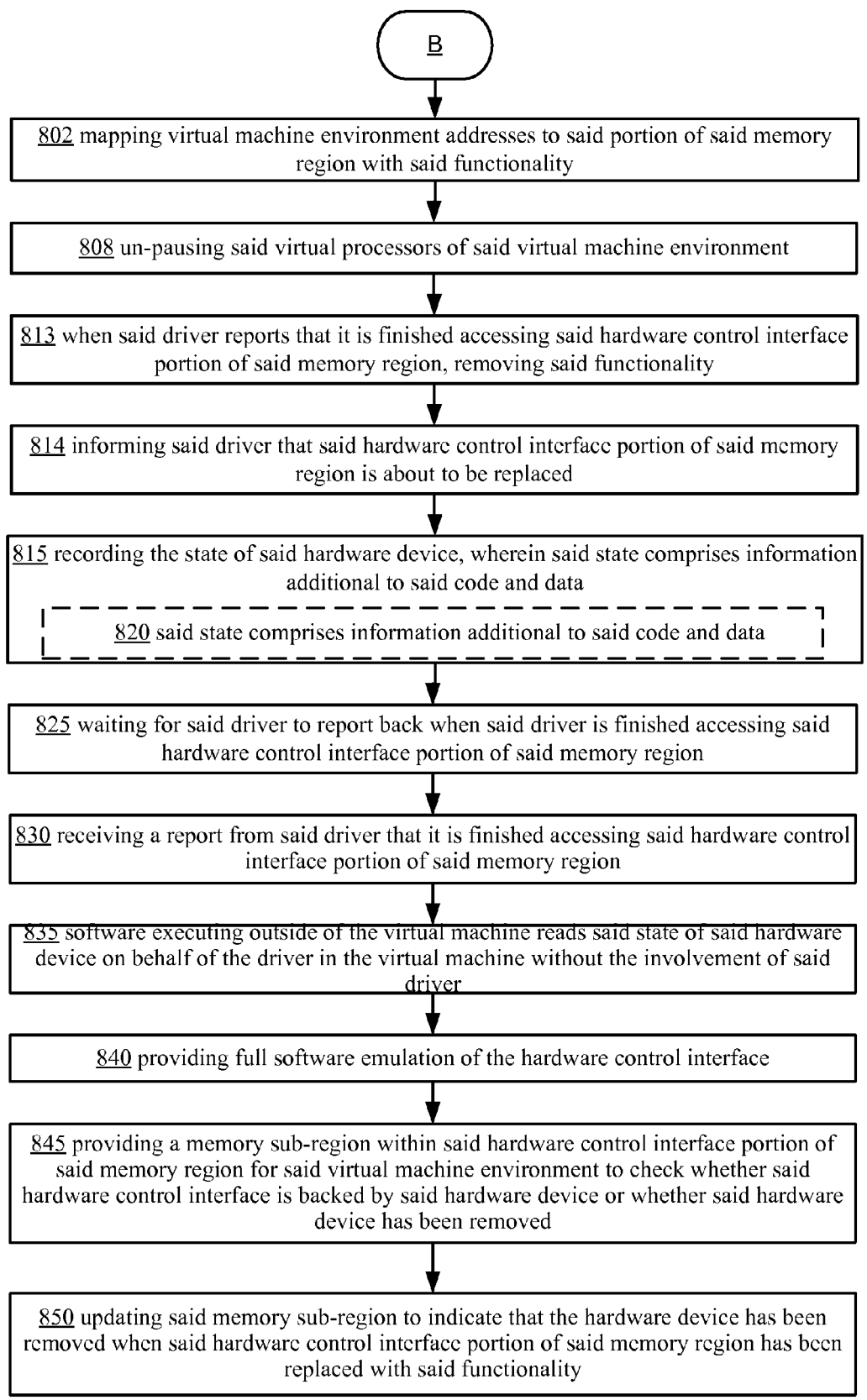
FIG. 8 illustrates an example of an operational procedure for maintaining accessibility to a memory region corresponding to a hardware device for a driver residing in a virtual machine environment.

FIGS. 6 through 8 depict an example of an operational procedure for maintaining accessibility to a memory region corresponding to a hardware device for a driver residing in a virtual machine environment, when said driver attempts to access said memory region and when said hardware device is configured to be removed from a computing environment. The procedure may include operations 600, 602, 604, and 606. Referring to FIG. 6, operation 600 begins the operational procedure and in operation 602 a hardware control interface portion of said memory region is configured to be replaced with functionality indicated by code and data associated with said hardware control interface, wherein the functionality is understandable to the driver when the hardware device has been removed from the computing environment. The actual code and data may not be directly visible to the driver, and the code may not be directly executed by the virtualization system. The code and data may instead by interpreted or emulated, or otherwise contained in some way to prevent the code from taking any actions or reading any data outside its intended scope. The code and data specify the behaviors that reads and writes to the virtual machine environment addresses should exhibit to the virtual machine. In other words, when the virtual machine performs a write operation to a relevant virtual machine environment address, the code performs an operation with the data that is written, possibly based on the state represented by the data. If a read operation is performed by the virtual machine, the code performs an operation to determine what value should be returned by the read, possibly based on the state represented by the data. Some of the data may be directly visible to the virtual machine via reads and writes, but not all the data need be visible to the virtual machine. This visibility may be achieved by using a read/write sub-portion, or may be achieved via the code "passing through" reads or writes to the data. Behavior equivalent to a visible portion of data may be achieved in other ways by the code. The functionality is configured 604 to move together with the virtual machine environment when the virtual machine environment is moved to a different computing environment.

FIG. 7 illustrates a further embodiment of the operational procedure 600 of FIG. 6. In operation 702 the functionality is configured to be moved along with the virtual machine environment when the virtual machine environment is saved, snapshotted, or live migrated. As discussed above, a virtual machine may be saved when the machine is being torn down. Snapshotting may take place when the virtual machine state needs to be fully characterized, and thus a copy may be made of a set of states and data as they were at a particular point in the time. Live migration is the process of transferring a virtual machine between different locations and environments. The data and behaviors thus may become part of the state of the virtual machine until the virtual machine indicates that data and behaviors are no longer needed. In operation 704 the functionality is configured to be become part of the state of said virtual machine environment. The virtual machine environment may be assigned the hardware device exclusively 706. Alternatively, the virtual machine environment may share the hardware device with at least one other virtual machine environment 707.

Operation 708 illustrates configuring the driver to stop using the functionality after a first period of time. Typically this time period should be as soon as possible after the driver has completed desired transactions. The first period of time may allow completion of a pending transaction 709. The virtualization system may continue to the next step when the predetermined time expires, or when the virtualization system receives a message from the driver that the driver has completed extracting data from the hardware. Alternatively, 710 illustrates configuring the driver to continue using the functionality for a second period of time. The second period of time may allow continued use until the driver relinquishes the interface 712.

Operation 713 illustrates that the functionality provides per-bit information to said driver. Operation 715 illustrates that the functionality comprises emulation behavior by a virtualizing mechanism. Operation 720 illustrates that the virtual machine environment is a child virtual machine of a parent virtual machine. In operation 725 the virtual processors are paused before the hardware control interface portion of the memory region is replaced with the functionality. Operation 730 illustrates replacing the hardware control interface portion of the memory region with the functionality.

Referring to FIG. 8, in operation 802 the virtual machine environment addresses are mapped to the portion of the memory region backed by the functionality. In operation 808 the virtual processors are paused, and in operation 813 the hardware control interface is removed when the driver reports that it is finished accessing the hardware control interface portion of the memory region.

In operation 814 the driver is informed that the hardware control interface portion of the memory region is about to be replaced. The state of the hardware device is recorded 815, the state comprising information additional to the code and data 820. Operation 825 illustrates waiting for the driver to report back when the driver is finished accessing the hardware control interface portion of the memory region. Operation 830 illustrates receiving a report from the driver that it is finished accessing the hardware control interface.

Operation 835 illustrates that software executing outside of the virtual machine may read the state of the hardware device on behalf of the driver in the virtual machine without the involvement of the driver. Full software emulation of the hardware control interface may be provided in operation 840.

Operation 845 illustrates providing a memory sub-region within the hardware control interface portion of the memory region to check whether the hardware control interface is backed by the hardware device or whether the hardware device has been removed. Operation 850 illustrates updating the memory sub-region to indicate that the hardware device has been removed when the hardware control interface portion of the memory region has been replaced.

Figure 9:
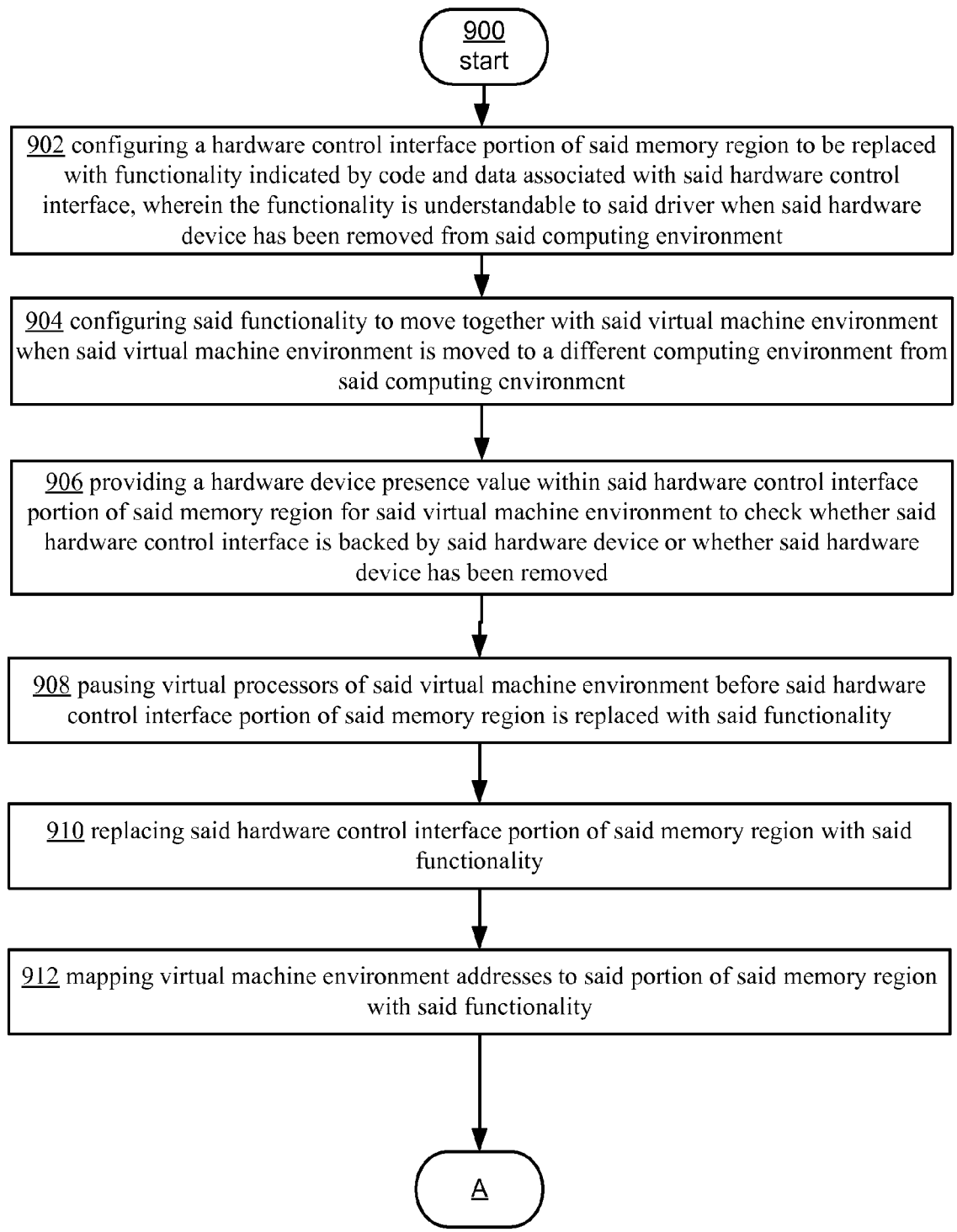
FIG. 9 depicts an exemplary operational procedure for maintaining accessibility to a memory region corresponding to a hardware device for a driver residing in a virtual machine environment.

FIG. 9 depicts an exemplary operational procedure for maintaining accessibility to a memory region corresponding to a hardware device for a driver residing in a virtual machine environment including operations 900, 902, 904, 906, 908, 910, 912, and 914. Referring to FIG. 9, operation 900 begins the operational procedure and operation 902 illustrates configuring a hardware control interface portion of the memory region to be replaced with functionality indicated by code and data associated with said hardware control interface, wherein the functionality is understandable to the driver when the hardware device has been removed from the computing environment. The functionality may be configured to move together with the virtual machine environment when the virtual machine environment is moved to a different computing environment 904. Operation 906 illustrates providing a hardware device presence value within the hardware control interface portion of the memory region to check whether the hardware control interface is backed by the hardware device or whether the hardware device has been removed.

Operation 908 illustrates pausing virtual processors of the virtual machine environment before the hardware control interface portion of the memory region is replaced with the functionality. In operation 910 the hardware control interface portion is replaced with the functionality. Operation 912 illustrates mapping the virtual machine environment addresses to the corresponding address in memory with the functionality.

Figure 10:
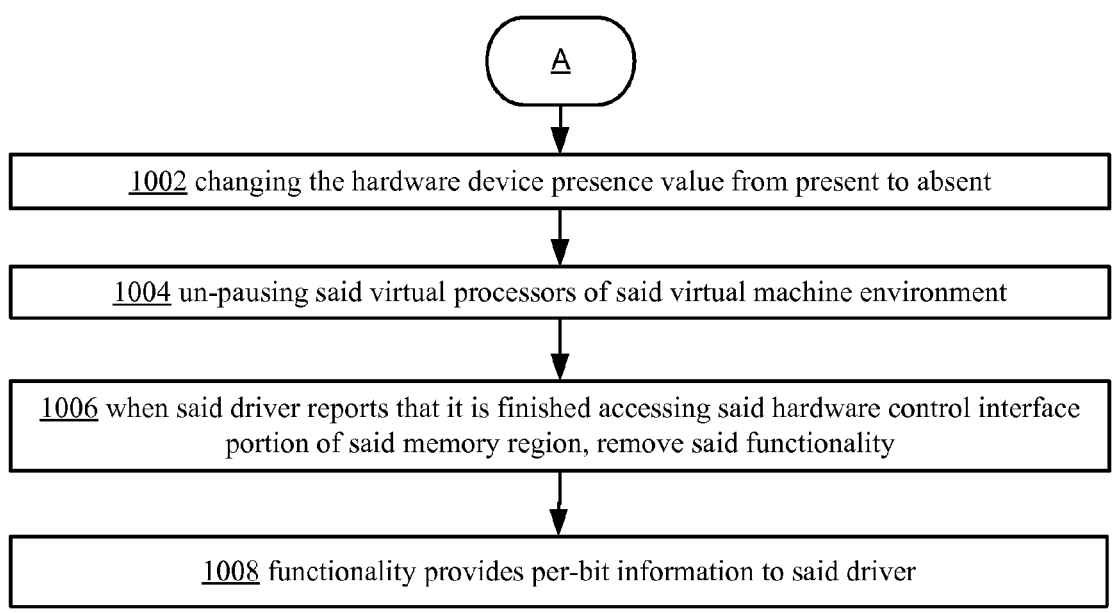
FIG. 10 depicts an exemplary operational procedure for maintaining accessibility to a memory region corresponding to a hardware device for a driver residing in a virtual machine environment.

Continuing with FIG. 10, Operation 1002 illustrates changing the hardware device presence value from present to absent. The virtual processors are paused in operation 1004, and the hardware control interface is removed when the driver reports that it is finished accessing the hardware control interface in operation 1006. Operation 1008 illustrates that the functionality provides per-bit information to the driver.

Figure 11:
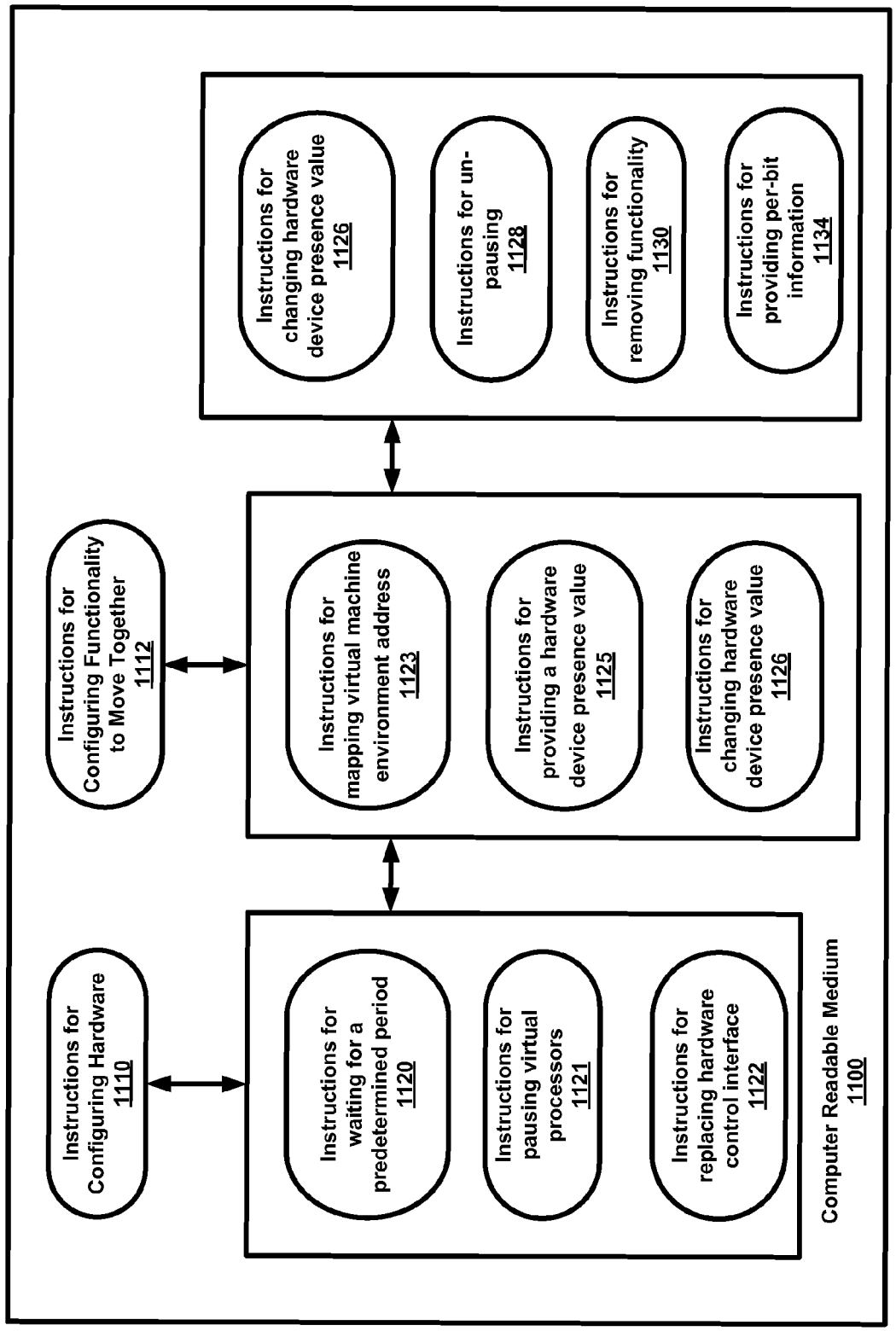
FIG. 11 illustrates a computer readable medium bearing computer executable instructions discussed with respect to FIGS. 1-10, above.

Any of the above mentioned aspects can be implemented in methods, systems, computer readable media, or any type of manufacture. For example, per FIG. 11, a computer readable medium can store thereon computer executable instructions for maintaining accessibility to a memory region corresponding to a control interface of a hardware device for a driver residing in a virtual machine environment. Such media can comprise a first subset of instructions for configuring a hardware control interface portion of the memory region to be replaced functionality indicated by code and data associated with said hardware control interface, wherein the functionality is understandable to the driver when the hardware device has been removed from the computing environment 1110; and a second subset of instructions for configuring the functionality to move together with the virtual machine environment when the virtual machine environment is moved to a different computing environment 1112. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 1020 for waiting for a predetermined period of time for a message from the driver indicating that the driver has completed extracting data from the hardware. The instructions 1020 can further comprise instructions for reading unextracted data from the hardware control interface and ignoring a message from the driver when the message is received after expiration of the predetermined period when the predetermined period of time expires before receiving said message from the driver.

Again, by way of example, the instructions can further comprise instructions for: pausing virtual processors of the virtual machine environment before the hardware control interface is replaced with the functionality 1121; replacing the hardware control interface portion of the memory region with the functionality 1122; mapping virtual machine environment addresses with the functionality 1123; providing a hardware device presence value within said hardware control interface portion of said memory region for said virtual machine environment to check whether said hardware control interface is backed by said hardware device or whether said hardware device has been removed 1125; changing the hardware device presence value from present to absent 1126; un-pausing the virtual processors 1128; and removing the functionality when the driver reports that it is finished accessing the hardware control interface 1130.

The instructions can further comprise instructions 1140 wherein the functionality provides per-bit information to said driver, the information comprising at least one of read-only, always 0 on read, always 1 on read, read-write, write of 1 clears/write of 0 leaves alone, write of 1 sets/write of 0 leaves alone, write of 0 clears/write of 1 leaves alone, write of 0 sets/write of 1 leaves alone, clear to 0 after first read, or set to 1 after first read.

Figure 1C:
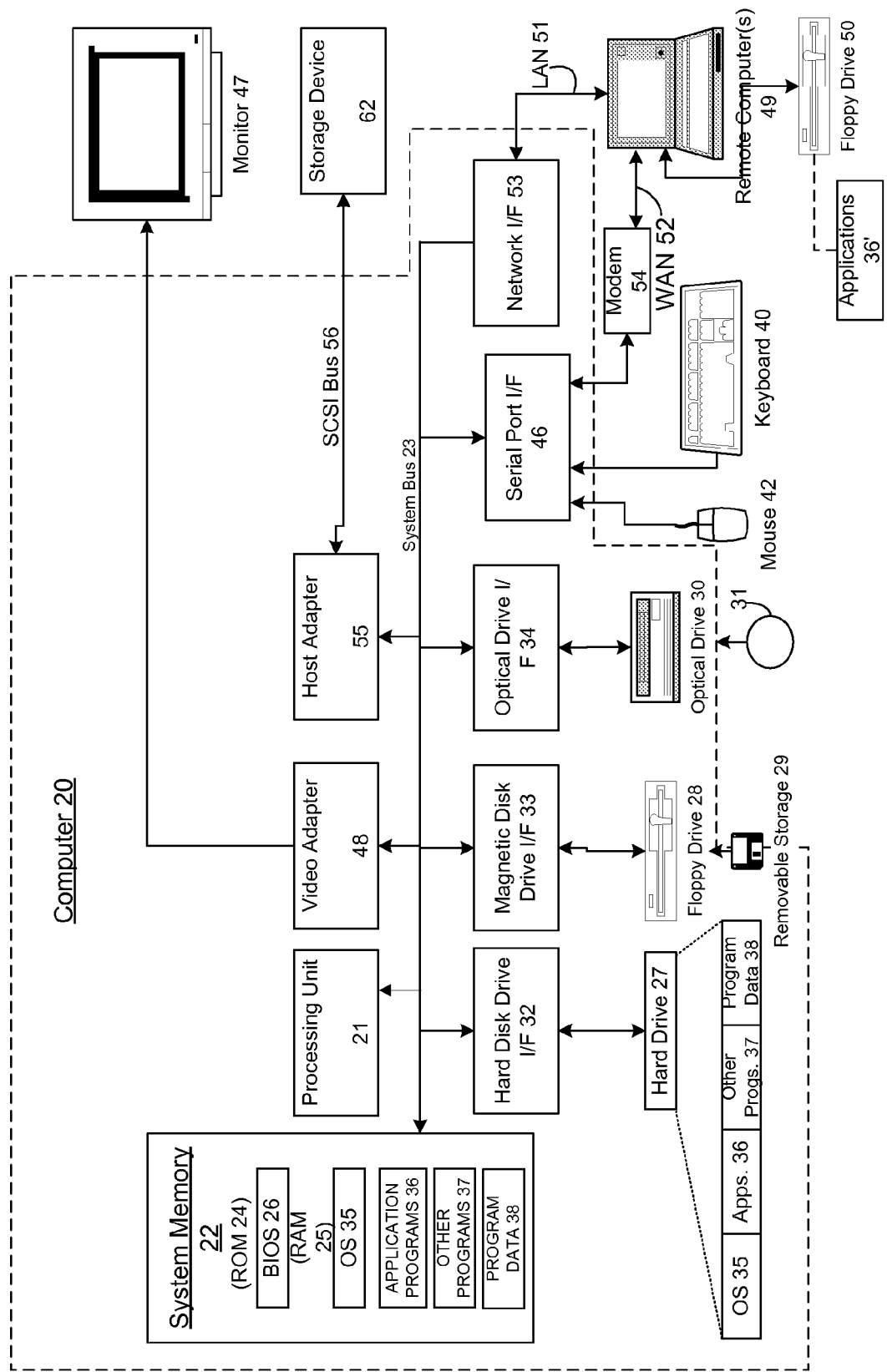
FIG. 1c depicts an example computer system wherein aspects of the present disclosure can be implemented.

As described above, aspects of the invention may execute on a programmed computer. FIG. 1c and the following discussion is intended to provide a brief description of a suitable computing environment in which aspects of the present disclosure may be implemented. One skilled in the art can appreciate that the computer system of FIG. 1c can in some embodiments effectuate various aspects of FIGS. 1a and 1b. In these example embodiments, the server and client can include some or all of the components described in FIG. 1c and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Referring to FIG. 1c, a computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1c. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for replacing the hardware backing the memory locations associated with a virtual machine with a backing mechanism. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method of maintaining accessibility to a memory region corresponding to a hardware device for a driver residing in a virtual machine environment, when said driver attempts to access said memory region and when said hardware device is configured to be removed from a computing environment, comprising:

configuring a hardware control interface portion of said memory region to be replaced with functionality indicated by code and data associated with said hardware control interface portion, wherein the functionality is understandable to said driver when said hardware device has been removed from said computing environment; and configuring said functionality to move together with said virtual machine environment when said virtual machine environment is moved to a different computing environment from said computing environment.

2. The method according to claim 1, wherein said functionality is configured to be moved along with said virtual machine environment when said virtual machine environment is one of being saved, snapshotted, or live migrated.

3. The method according to claim 1, wherein said functionality is configured to be become part of the state of said virtual machine environment.

4. The method according to claim 1, wherein said virtual machine environment is assigned said hardware device exclusively.

5. The method according to claim 1, wherein said virtual machine environment shares said hardware device with at least one other virtual machine environment.

6. The method according to claim 1, further comprising configuring said driver to stop using said hardware control interface after a first period of time, wherein the first period of time allows completion of a pending transaction.

7. The method according to claim 1, further comprising configuring said driver to continue using said functionality for a second period of time, wherein the second period of time allows continued use until the driver relinquishes the interface.

8. The method according to claim 1, wherein said functionality provides per-bit information to said driver.

9. The method according to claim 1, wherein said functionality comprises emulation behavior by a virtualizing mechanism.

10. The method according to claim 1, wherein said virtual machine environment is a child virtual machine of a parent virtual machine.

11. The method according to claim 1, further comprising:
pausing virtual processors of said virtual machine environment before said hardware control interface portion of said memory region is replaced with said functionality;
replacing said hardware control interface portion of said memory region with said functionality;
mapping virtual machine environment addresses to said portion of said memory region with said functionality;
un-pausing said virtual processors of said virtual machine environment; and
when said driver reports that it is finished accessing said hardware control interface portion of said memory region, removing said functionality.

12. The method according to claim 1, further comprising:
informing said driver that said hardware control interface portion of said memory region is about to be replaced;
recording the state of said hardware device, wherein said state comprises information additional to said code and data;
waiting for said driver to report back when said driver is finished accessing said hardware control interface portion of said memory region; and
receiving a report from said driver that it is finished accessing said hardware control interface portion of said memory region.

13. The method according to claim 12, wherein software executing outside of the virtual machine reads said state of said hardware device on behalf of the driver in the virtual machine without the involvement of said driver.

14. The method according to claim 1, further comprising providing full software emulation of the hardware control interface portion.

15. The method according to claim 1, further comprising:
providing a memory sub-region within said hardware control interface portion of said memory region for said virtual machine environment to check whether said hardware control interface portion is backed by said hardware device or whether said hardware device has been removed; and
updating said memory sub-region to indicate that the hardware device has been removed when said hardware control interface portion of said memory region has been replaced with said functionality.

16. A system adapted to maintain accessibility to a memory region corresponding to a hardware device for a driver residing in a virtual machine environment, comprising:
at least one processor; and
at least one memory communicatively coupled to said at least one processor, the memory having stored therein computer-executable instructions capable of:
configuring a hardware control interface portion of said memory region to be replaced with functionality indicated by code and data associated with said hardware control interface, wherein the functionality is understandable to said driver when said hardware device has been removed from said computing environment;
configuring said functionality to move together with said virtual machine environment when said virtual machine environment is moved to a different computing environment from said computing environment;
providing a hardware device presence value within said hardware control interface portion of said memory region for said virtual machine environment to check whether said hardware control interface is backed by said hardware device or whether said hardware device has been removed;
pausing virtual processors of said virtual machine environment before said hardware control interface portion of said memory region is replaced with said functionality;
replacing said hardware control interface portion of said memory region with said functionality;
mapping virtual machine environment addresses to said portion of said memory region with said functionality;
changing the hardware device presence value from present to absent;
un-pausing said virtual processors of said virtual machine environment; and
when said driver reports that it is finished accessing said hardware control interface portion of said memory region, removing said functionality.

17. The system of claim 16, wherein said functionality provides per-bit information to said driver.

18. A computer readable storage medium storing thereon computer executable instructions for maintaining accessibility to a memory region corresponding to a hardware device for a driver residing in a virtual machine environment, comprising instructions for:
configuring a hardware control interface portion of said memory region to be replaced with functionality indicated by code and data associated with said hardware control interface portion, wherein the functionality is understandable to said driver when said hardware device has been removed from said computing environment; and
configuring said functionality to move together with said virtual machine environment when said virtual machine environment is moved to a different computing environment from said computing environment.

19. The computer readable storage medium of claim 18, further comprising instructions for:
waiting for a predetermined period of time for a message from the driver indicating that the driver has completed extracting data from the hardware, further comprising, when the predetermined period of time expires before receiving said message from the driver, reading unextracted data from the hardware control interface and ignoring said message from the driver when the message is received after expiration of said predetermined period;
pausing virtual processors of said virtual machine environment before said hardware control interface portion of said memory region is replaced with said functionality;
replacing said hardware control interface portion of said memory region with said functionality;

mapping virtual machine environment addresses to said portion of said memory region with said functionality;

providing a hardware device presence value within said hardware control interface portion of said memory region for said virtual machine environment to check whether said hardware control interface portion is backed by said hardware device or whether said hardware device has been removed;

changing the hardware device presence value from present to absent;

un-pausing said virtual processors of said virtual machine environment; and when said driver reports that it is finished accessing said hardware control interface portion of said memory region, removing said functionality.

20. The computer readable storage medium of claim 19, wherein said functionality provides per-bit information to said driver, the information comprising at least one of read-only, always 0 on read, always 1 on read, read-write, write of 1 clears/write of 0 leaves alone, write of 1 sets/write of 0 leaves alone, write of 0 clears/write of 1 leaves alone, write of 0 sets/write of 1 leaves alone, clear to 0 after first read, or set to 1 after first read.

* * * * *